(12) United States Patent
Amit Dilip et al.

(10) Patent No.: US 12,534,149 B2
(45) Date of Patent: Jan. 27, 2026

(54) VEHICLE

(71) Applicant: TVS MOTOR COMPANY LIMITED, Chennai (IN)

(72) Inventors: Rajwade Amit Dilip, Chennai (IN); Vinay Chandrakant Harne, Chennai (IN)

(73) Assignee: TVS Motor Company Limited, Chennai (IN)

( * ) Notice: Subject to any disclaimer, the term of this patent is extended or adjusted under 35 U.S.C. 154(b) by 466 days.

(21) Appl. No.: 18/251,114

(22) PCT Filed: Oct. 29, 2021

(86) PCT No.: PCT/IN2021/051037
§ 371 (c)(1),
(2) Date: Apr. 28, 2023

(87) PCT Pub. No.: WO2022/091138
PCT Pub. Date: May 5, 2022

(65) Prior Publication Data
US 2023/0406440 A1    Dec. 21, 2023

(30) Foreign Application Priority Data
Oct. 29, 2020   (IN) .............................. 202041047383

(51) Int. Cl.
*B62J 17/086*    (2020.01)
*B62J 9/23*    (2020.01)
(Continued)

(52) U.S. Cl.
CPC .............. *B62J 17/086* (2020.02); *B62J 9/23* (2020.02); *B62J 9/26* (2020.02); *B62J 19/00* (2013.01)

(58) Field of Classification Search
CPC . B62J 17/00; B62J 17/08; B62J 17/086; B62J 9/23; B62J 9/26; B62J 19/00; B62K 19/40; B62K 19/48
See application file for complete search history.

(56) References Cited

U.S. PATENT DOCUMENTS

| | | | | |
|---|---|---|---|---|
| 5,791,718 A | * | 8/1998 | Boutin | B62J 17/10 296/136.01 |
| 2006/0192403 A1 | * | 8/2006 | Weddington | B60J 7/102 296/77.1 |
| 2018/0072164 A1 | * | 3/2018 | Plesniak | B60L 53/00 |

FOREIGN PATENT DOCUMENTS

| CN | 1951757 A | 4/2007 |
|---|---|---|
| CN | 1974307 A | 6/2007 |

(Continued)

OTHER PUBLICATIONS

International Search Report issued in corresponding International Application No. PCT/IN2021/051037 mailed Feb. 16, 2022 (4 pages).

(Continued)

*Primary Examiner* — Daniel J Colilla
(74) *Attorney, Agent, or Firm* — Osha Bergman Watanabe & Burton LLP

(57) ABSTRACT

A step-through type vehicle includes: a frame assembly; at least one front wheel and at least one rear wheel connected to the frame assembly and rotated by a power unit; and a plurality of portions comprising one or more flexible portions, and one or more fixed portions. The fixed portions include a front structure, a rear structure, and a top structure disposed between the front structure and the rear structure. The flexible portions include at least one retractable member. The top structure and the retractable member include a plurality of solar panels. The retractable member is detachably attached with the top structure, and is retracted (Continued)

upwardly towards the top structure, and stretched downwardly from the top structure towards the front wheel and the rear wheel. The retractable member is foldably stowed inside at least one box like compartment, which is at least one part of the rear structure.

23 Claims, 8 Drawing Sheets

(51) Int. Cl.
    *B62J 9/26*     (2020.01)
    *B62J 19/00*     (2006.01)

(56) References Cited

FOREIGN PATENT DOCUMENTS

| | | |
|---|---|---|
| CN | 201472176 U | 5/2010 |
| CN | 201792936 U | 4/2011 |
| CN | 109866855 A | 6/2019 |
| JP | H05-4597 A | 1/1993 |
| WO | 2019/043561 A1 | 3/2019 |

OTHER PUBLICATIONS

Written Opinion issued in corresponding International Application No. PCT/IN2021/051037 mailed Feb. 16, 2022 (12 pages).

* cited by examiner

VEHICLE

TECHNICAL FIELD

The present subject matter, in general, relates to a vehicle and in particular, relates to a two- or three-wheeled straddle type vehicle.

BACKGROUND

Generally, small sized vehicles and especially vehicles used for personal transportation are made in a manner that typically the rider is capable of commuting from one place to another. Such small sized vehicles are also made to accommodate a pillion to accompany the rider. These vehicles are generally provided with two wheels. Though, in certain variants, they can be provided with an additional wheel added either to the front wheel or to the rear wheel or in some cases to both. Such configurations are provided to make the vehicle stand on the wheels instead of a dedicated vehicle support structure such as a center stand or a side stand. Further, addition of one or more wheels to two-wheelers also adds stability and balance while riding compared to a conventional two-wheeler thereby avoiding capsizing. All these are achieved without much increase on the overall width and length of a typical two-wheeler, which ensures that the rider can maneuver with nearly the same way as he or she does on a two-wheeler and the vehicle is more compact than a conventional four-wheeler. Such vehicles are also advantageously provided with a small sized power unit.

One of the primary features of such a vehicle is that the occupants of the vehicle including the rider are seated on a seating structure that allows the occupants to straddle or step-through to occupy the seat and are sans doors. The occupants are generally seated one behind the other, in some cases they are seated side by side. More often than not, such vehicles are exposed to atmosphere and are not enclosed in nature, and in several instances, do not contain a roof structure.

BRIEF DESCRIPTION OF THE DRAWINGS

The detailed description is described with reference to the accompanying figures.

DETAILED DESCRIPTION

Figure 1:
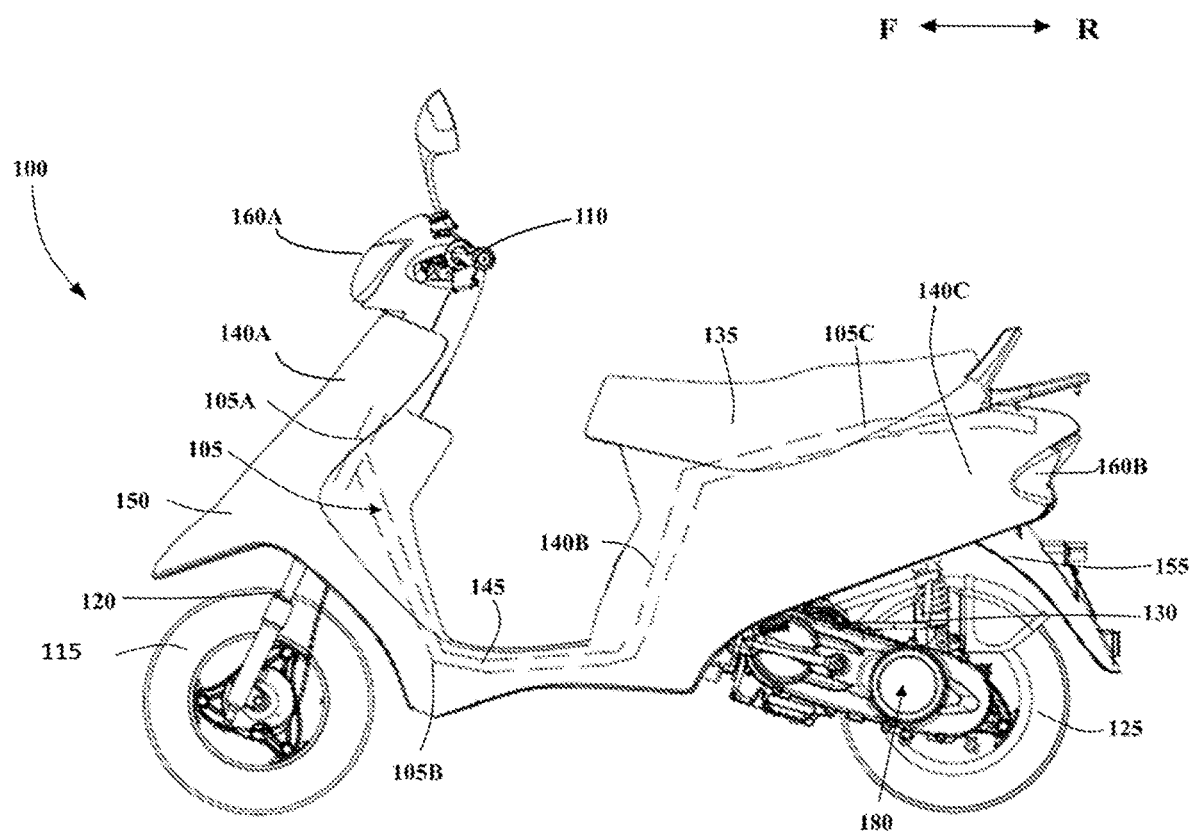
FIG. 1 illustrates a step-through type vehicle, in accordance with an embodiment of the present subject matter.

Several attempts have been made in the past to provide compact personal transportation vehicles such as two-wheelers with a roof like structure. However, such attempts have hardly been successful due to various technical limitations.

One such technical limitation being the bulkier configurations of roof like structures known in the existing art. Such bulkier configurations almost make a two-wheeled vehicle used for personal transportation look like a passenger car, which in turn adversely affects utility for the user as well as design flexibility for the designer. Further, such known configurations are much heavier and increase the position of the center of gravity of the vehicle from the ground level, due to a larger disposition of mass above the seating position of the vehicle. It is more applicable in case of vehicles provided with two or three wheels, which makes vehicle handling much more difficult. Moreover, such roof like structures provided on vehicles are generally provided for better safety of the rider & pillion from external weather conditions such as wind, dust, sun etc. In the known art, such structures are generally made of combination of solar panels & support members which either run on complete solar energy or aid the powertrain and/or one or more loads of the vehicle.

Furthermore, existing vehicles which are provided with solar panel embedded roof structures are either formed as complete enclosures, which clearly make vehicle handling and vehicle manoeuvring difficult, or as extended visor like panels, which leads to various other problems including vibration of panels at high speed and fragile roof structure design without stable support. Further, in such vehicles, extension of solar panels throughout the enclosure including the front visor area towards the pillars supporting the roof structure can lead to poor corner visibility & accidents. Moreover, widening the pillar area in order to enhance the solar impedance area is also detrimental to safety as it may lead to obstructing or restricting the rider's view. Furthermore, reducing the pillar area may lead to loss of solar impedance area around the front portion of the vehicle, which is detrimental too.

Other than the above stated problems, there are other important problems that are associated with the existing solar panel embedded roof structures. These include positioning of rear view mirror assemblies, which are often extended in vehicle widthwise direction, which leads to various safety concerns. Moreover, in many known configurations, the space available for the occupants including the rider and the pillion are often compromised for the sake of increasing area of solar panels in the vehicle. Such vehicles referred to as canopy type vehicles often deviate from the basic requirement of a personal transportation type vehicle like two-wheeler and often end up in increasing the complexity for the user for the sake of providing a roof structure.

Moreover, there exist several problems with respect to vehicles provided with roof-top solar panel structures. For instance, in the past, various attempts relating to providing covers and/or roofs made of solar cells have been made, especially in bigger automobiles such as passenger cars. For instance, conventionally a tarpaulin-based cover is known to contain a plurality of solar cells. Such tarpaulin covers helps in externally covering the car when not in use. However, the drawback with such solar powered tarpaulin covers is that they are a separate entity from the vehicle and need to be stowed when vehicle is to be used. Moreover, they tend to sag during prolonged usage due to its flexible nature, which may damage the solar cells disposed on the external surface.

In the past, attempts have also been made to address the above-described problem of sagging. For instance, solar cell covers were made to include intermediate structural members and elastic members at ends provided with solar cells. However, such structures are complicated and cumbersome to use. They still have to be manually unfolded and covered over the car.

The problem with the flexibility of covers with solar cells was overcome by fixed shields provided with solar cells. The fixed shield is electrically connected with the battery of the car enabling charging of the battery using solar power. However, such shields are still a separate entity from the vehicle itself and the use of such shields is cumbersome due to its odd shape and heavy structure. Moreover, the fixed shields may not completely cover all area e.g. corners of the car.

The problem associated with the cumbersome usage of the solar shields was overcome by automatic shields provided with solar cells, which includes flexible shields and other structural members to provide necessary rigidity. Such automatic shields are typically housed in a dedicated storage space usually provided at the rear of a car. However, such structures required dedicated storage in the vehicle, which may not be the case with all segments of automobiles especially compact saddle type two and three wheeled vehicles. Further, such structures also require dedicated mechanism for automatic unfolding and folding of the shield.

Also known are vehicles with portable solar shields. For instance, a known two-layer portable solar shield contains an outer layer with plurality of solar cells and an inner layer provided with a battery capable of being charged by the solar cells. Typically, such construction comes with an inbuilt pump used for inflating and deflating the solar shield. However, such structures are both complicated and difficult to manufacture and use.

The other known type of portable solar shields includes foldable solar panels, which has a construction to achieve folding and unfolding of the solar panels, for instance, a central shaft over which the solar panel is folded, a guide member over which the solar panels unfold and electrically controlled actuators, which enable folding and unfolding of the solar panels. As with the other portable solar shield, this type of construction is also cumbersome to use and involves a complex construction.

Further attempts were made to solve the problem with respect to handling of the solar panel covers for automobiles by using commonly known shape memory alloys on the flexible solar panels. However, usage of such flexible solar panels with shape memory alloys is restricted to the shape of a particular vehicle and hence cannot be used across all types of vehicles, especially vehicles with canopy that already has the necessity to balance and are not a cost effective solution. Thus, the dynamic requirements of such vehicles with canopy make it difficult to adapt structures with shape memory alloys. Further, such flexible solar panels with shape memory alloys are stored in a dedicated storage space upon folding. Hence, any such addition of storage space adds to the overall weight of the vehicle with canopy structure, which in turn affects the dynamics of the vehicle. Moreover, it is clear from the available technologies in the state of the art that almost all of the solutions provided including that of shape memory alloys, automatic folding mechanism leads to substantial increase in the cost of the vehicle. Hence, the solutions available in the state of the art cannot be considered as economically feasible solution to be implemented in vehicles provided with canopy structure.

Thus, there is a requirement of providing a solar panel for a vehicle with a canopy structure that overcomes all the above stated problems known in the prior art.

The present subject matter has been devised in view of the above circumstances as well as solving other problems of known art.

In an embodiment of the present subject matter, the present subject matter relates to a vehicle used for personal transportation with a portable canopy structure provided with solar panels.

As per an aspect of the present embodiment of the present subject, the canopy structure of the present subject matter includes a plurality of portions containing solar panels or array of photo voltaic cells embedded in the panel capable of receiving solar energy and charging an energy storage device. The plurality of portions containing solar panels includes a combination of one or more fixed portions and one or more flexible portions. Configuring the solar panel with split hybrid design portions viz. one or more fixed portions and one or more flexible portions enables maximum exposure area when both the one or more fixed portions and one or more flexible portions are employed, while minimum exposure area is achieved when only fixed portion is employed.

As per another aspect of the present embodiment of the present subject, the one or more fixed portions of the vehicle include a front structure, a rear structure and a top structure. The rear structure includes the seat assembly, the backrest and the extended backrest. The mounting member of the rear structure is a pillion handle. The top structure is one of the one or more fixed portions and present at the top of the vehicle, forming a roof type structure for the vehicle and includes plurality of solar panels. Further the top structure is made of a single piece connecting the front structure and the rear structure of the vehicle.

As per another aspect, the one or more flexible portions extend substantially sidewardly downwardly from the edges of the top structure of the vehicle. The one or more flexible portions are capable of being retracted upwardly towards the top structure of the vehicle and stretched downwardly towards the wheels of the vehicle. The one or more flexible portions include a plurality of solar panels.

As per another aspect, the one or more fixed portion includes a cover member extending substantially horizontally rearwardly above the seat sub-structure. The cover member is capable of shielding occupants of the vehicle, for example, in the first configuration, from external environmental factors including wind, rainfall and snowfall.

As per another aspect of the present embodiment, the one or more flexible portions are capable of being detachably attached. The one or more flexible portions are in folded condition or detached when the vehicle is in operable condition.

As per another aspect of the present embodiment, the one or more flexible portions are in unfolded condition or attached with the one or more fixed portions when the vehicle is in inoperable condition.

As per another embodiment, the top structure is substantially dome shaped and provided with chamfered edges. In an alternative embodiment, the top structure is spheroid shaped without the edges being chamfered. In a further alternative embodiment, the top structure is spheroidal, for example half-egg shaped or elliptical profile. Further, in other alternative embodiments, the top structure is elliptical spheroid or egg shaped.

In another embodiment, the vehicle is an electric operated vehicle, wherein the power unit is an electric motor. In another embodiment, the vehicle is a hybrid vehicle, and the power unit includes an engine assembly and an electric motor.

In an embodiment, the one or more portions of the fixed portion include at least one portion acting as a backrest member extending substantially upwardly from a rearmost portion of the seat sub-structure.

In an alternate embodiment the one or more flexible portions are retractable and capable of being folded upwardly up to a predetermined full length substantially equal to length of the vehicle or completely and unfolded downwardly up to a predetermined length or completely manually or by automated means. In an alternate embodiment the one or more flexible portions include one or more sensors that restrict the downward movement of the one or more flexible portions when the vehicle is in operable condition.

In another embodiment, the plurality of portions viz., one or more fixed portions and one or more flexible parts is made of a light weight material selected from a group consisting of composite material like fiber reinforced plastic and polyacrylonitrile, aluminum, sheet metal and plastic.

In another embodiment, the one or more flexible portions is capable of being detached from the vehicle and the solar panels can produce solar power and charge a power source separately.

In an embodiment, the one or more flexible portions is capable of being foldably stowed inside a boxlike compartment. The boxlike compartment being at least a part of the rear structure of the vehicle and the boxlike compartment is capable of being detachably attached to a mounting member of the rear structure of the vehicle. As per another embodiment the box like compartment is an extended backrest structure of the vehicle.

In an embodiment, the box like compartment acts as a solar kit assembly capable of being detachably attached to the vehicle.

In an embodiment, the plurality of solar panels of the vehicle is capable of producing energy for auxiliary functions of the vehicle, thereby eliminating the need of an auxiliary battery of the vehicle.

These and other advantages of the present subject matter would be described in greater detail in conjunction with and embodiment of a saddle type two wheeled vehicle along with the figures in the following description. The present subject matter is further described with reference to accompanying figures. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a left side view of an exemplary vehicle 100, in accordance with an embodiment of the present subject matter. The vehicle 100 has a frame assembly 105 having a step-through type layout. The frame assembly 105 includes a head tube 105A, a main tube 105B extending downwardly rearward from the head tube 105A, and a pair of railing 105C that extend inclinedly rearward. A handlebar assembly 110 is mounted to a steering shaft (not shown). The steering shaft is rotatably supported by the head tube 105A. A front wheel 115 is connected to the frame assembly 105 through one or more front suspension(s) 120. A power unit 180 is swingably mounted to the frame assembly 105. In an embodiment, the power unit 180 is an engine functionally coupled to a rear wheel 125. In another embodiment, the power unit 180 is a motor, for example, a hub motor mounted on the hub of the rear wheel 125. In an alternative embodiment, the power unit 180 is a rotating shaft motor mounted on swinging portion, while in another alternative embodiment, the power unit 180 is a chassis mounted shaft rotating motor.

Further, the rear wheel 125 is connected to the frame assembly 105 through one or more rear suspension(s) 130. In an embodiment, the power unit 180 is swingably connected to the frame assembly 105 through a toggle link (not shown). A seat assembly 135, also interchangeably called as a seat sub-structure 135 is disposed upwardly of the power unit 180 and is supported by the pair of railings 105C. A storage compartment (not shown) provided below the seat assembly 135 are supported by the pair of railing(s) 105C. The utility box is accessible in an open condition of the seat assembly 135.

Furthermore, the vehicle 100 is provided with plurality of panels 140A, 140B, and 140C. A floorboard 145 is disposed at a step-through space defined by the frame assembly 105. The user can operate the vehicle by resting feet on the floorboard 145, in a sitting position. A front fender 150 is covering at least a portion of the front wheel 115. In the present embodiment, the front fender 150 is integrated with the panels 140A. A rear fender 155 covers at least a portion of the rear wheel 125. The front fender 150 and the rear fender 155 prevent splashing of dirt on to the vehicle parts and away from the vehicle 100. In one embodiment, a fuel tank (not shown) is supported by the frame assembly 105 and is functionally coupled to the engine assembly 180. The vehicle 100 comprises of plurality of electrical/electronic components including a headlight 160A, a tail light 160B, a battery (not shown), a transistor controlled ignition (TCI) unit (not shown), an alternator (not shown), a starter motor (not shown).

Figure 2A:
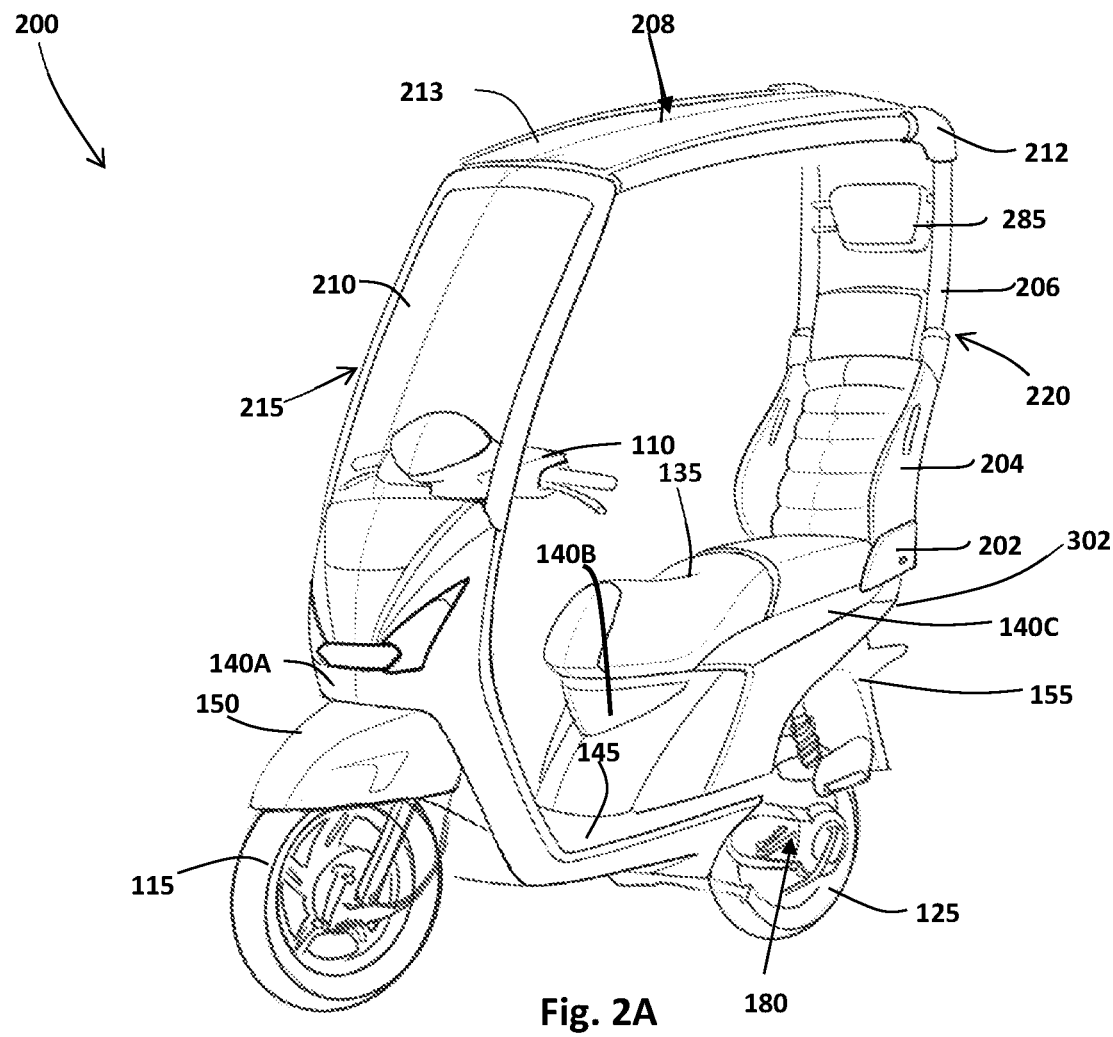
FIG. 2A illustrates a left side perspective view of a vehicle provided with a canopy structure, in accordance with an embodiment of the present subject matter.

FIG. 2A illustrates a left side perspective view of a straddle type vehicle 200 provided with a canopy structure, herein referred as 'the vehicle 200', in accordance with an embodiment of the present subject matter. In an embodiment, the vehicle 200 includes a plurality of portions containing solar panels 213 or array of photo voltaic cells embedded in the panel capable of receiving solar energy and charging an energy storage device. The plurality of portions containing solar panels 213 includes one or more fixed portions and one or more flexible portions. The one or more fixed portions of the vehicle 200 include a front structure 215, a rear structure 220 and a top structure 208. The top structure 208 extends between the front structure 215 and the rear structure 220 of the vehicle 200. In an embodiment, the top structure 208 is made of a single piece adaptable to be joined with a windshield structure 210, also called as a windshield member 210 of the front structure 215 at a front end thereof. The rear structure 220 includes the seat sub structure 135, a backrest structure 204 and an extended backrest structure 206. Similarly, in an embodiment, the top structure 208 is adaptable to be joined with the extended backrest structure 206, extending upwardly rearward from a top portion of the backrest structure 204, also called as a backrest member 204 of the rear structure 220 of the vehicle 200.

As per another embodiment, the top structure 208 is substantially dome shaped and provided with chamfered edges. In an alternative embodiment, the top structure is spheroid shaped without the edges being chamfered. In a further alternative embodiment, the top structure 208 is spheroidal, for example half-egg shaped or elliptical profile. Further, in other alternative embodiments, the top structure 208 is elliptical spheroid or egg shaped.

As per another aspect, the top structure 208 acts as a cover member extending substantially horizontally rearwardly above the seat sub-structure 135, being capable of shielding occupants of the vehicle 200. For example, in the first configuration, from external environmental factors including wind, rainfall and snowfall.

In an embodiment, the windshield structure 210 includes a visor capable of shielding a rider of the vehicle 200 from wind and sunlight, which otherwise obstructs the rider from maneuvering ahead with ease. In one embodiment, the top structure 208 is joined to the extended backrest structure 206 by means of one or more couplers 212, which apart from providing a rigid joint at the ends also enhances ease of assembly and disassembly. In an embodiment, the extended backrest structure 206 of the rear structure 220 is provided with a transversely extending head rest portion 285, which allows a pillion rider to comfortably rest his/her head during ride. The rear structure 220 includes a mounting member 302 capable of receiving one or more portions of the rear structure 220. In an embodiment, the backrest structure 204 and the extended backrest structure 206 are aligned coaxially in order to ergonomically support the seating position of the pillion rider. In an alternative embodiment, the top structure 208 is enmolded with the front structure 215 and the rear structure 220.

Figure 2B:
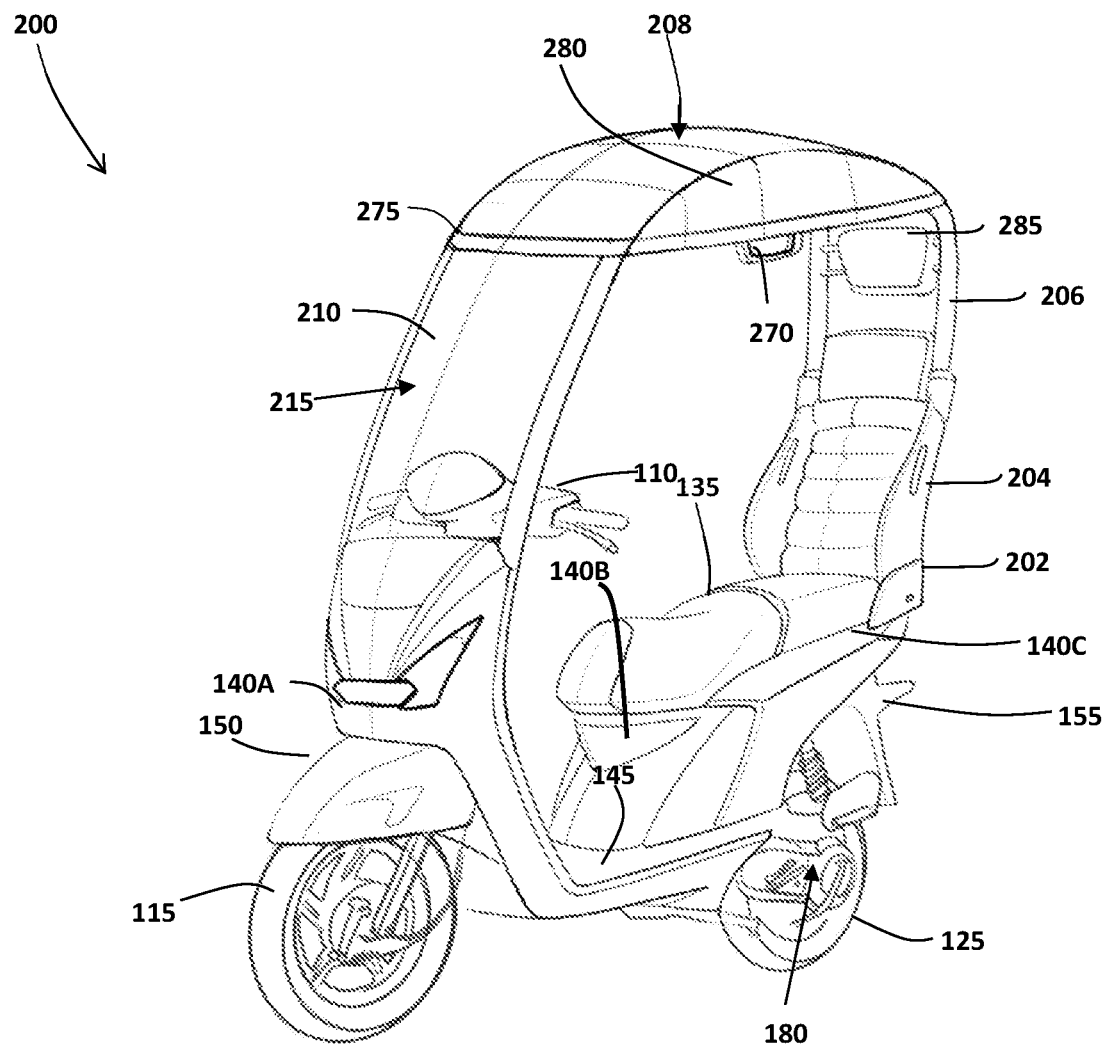
FIG. 2B depicts a left side perspective view of the vehicle shown in FIG. 2A provided with a canopy structure, in accordance with another embodiment of the present subject matter.

FIG. 2B depicts a left side perspective view of the vehicle 200 shown in FIG. 2A provided with a canopy structure, in accordance with another embodiment of the present subject matter. As per this embodiment, the vehicle 200 has a top structure 208 that is dome shaped. In an embodiment, the top structure 208 of the vehicle 200 is oval shaped when viewed from the top. Further, in one embodiment, the top structure 208 is embedded with a plurality of solar panels 213 In an embodiment, the top structure 208 is rounded at all corners extending forwardly to join with the windshield structure 210 of the front structure 215 (shown in FIG. 2A) and extending rearwardly to join with the extended backrest structure 206 of the rear structure 220. In an embodiment, the plurality of solar panels 213 (shown in FIG. 2A) are disposed uniformly across an upper surface of the top structure 208 extending forwardly and downwardly to a front most portion 275 of the top structure 208 and extending sidewardly and downwardly as a sideward portion 280 of the top structure 208. In an embodiment, the sideward portion 280 of the top structure 208 includes plurality of solar panels 213 being substantially perpendicular to the angle of incidence of sunlight, thereby allowing maximum exposure to sunlight during all positions of sun in a day. In another embodiment the sideward portion 280 of the top structure 208 is one of the one or more fixed portions of the vehicle 200. The outer surface area of the sideward portion 280 of the top structure 208 is between 5% to 50% of the outer surface area of the top structure 208. In an embodiment, the top structure 208 includes at least one pillion handle 270 disposed downwardly from side most portion 295 of the top structure 208 (shown in FIG. 3), allowing the pillion to hold during riding condition.

Figure 3:
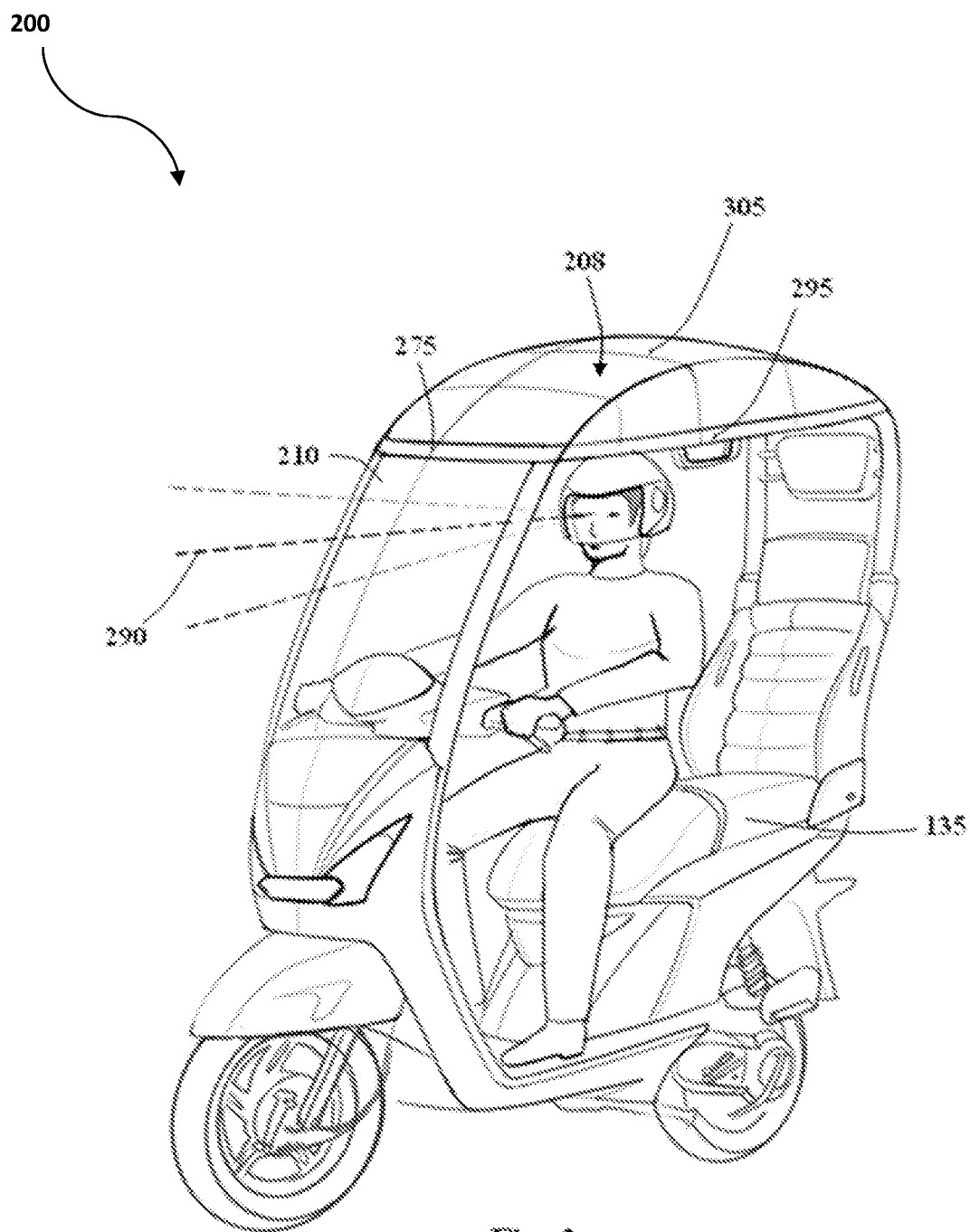
FIG. 3 depicts another left side perspective view of the vehicle shown in FIG. 2B provided with a canopy structure, in accordance with an embodiment of the present subject matter.

FIG. 3 depicts another left side perspective view of the vehicle 200 shown in FIG. 2B provided with a canopy structure, in accordance with another embodiment of the present subject matter. In an embodiment, the top structure 208 includes an upper surface and a bottom surface. The plurality of solar panels 213 (shown in FIG. 2A) embedded into the upper surface of the top structure 208 are uniformly distributed such that a square unit, for example of a size of one square centimetre of the plurality of solar panels 213, is capable of generating approximately 6 to 16 milliwatts of power per square centimetre. In an embodiment, the plurality of solar panels 213 are closely spaced apart from each other uniformly across the dome shaped top structure 208. In another embodiment, the plurality of solar panels 213 are more densely stacked at the top structure 208, while are not as densely stacked extending forwardly towards the front most portion 275 and a corresponding rearwardly disposed rear most portion (not shown). In one embodiment, the plurality of solar panels 213 stacked in the sideward portion 280 (shown in FIG. 2B) extending downwardly to the side most portion 295 is substantially higher as compared to the plurality of solar panels stacked forwardly extending towards the front most portion 275 and the corresponding rear most portion.

In an embodiment, the plurality of solar panels 213 on the front most portion 275 of the top structure 208 are so disposed that the positioning of the solar panels 213 do not substantially affect a cone of vision 290 of the rider at any point of time during the ride. In an embodiment, the front most portion 275 is disposed such that the line of vision of the rider ranges in a cone angle θ from approximately 0° to 10°. In another embodiment, the front most portion 275 can extend downwardly to a maximum predetermined position up to which the line of vision 290 of the rider remains unaffected, for example in a cone angle θ ranging approximately between 10° to 30°. In an alternative embodiment, the top structure 208 of the vehicle 200 can be of any other shape other than a spheroidal, dome or oval shape, which provides a similarly enhanced area of exposure of the plurality of solar panels 213 to sunlight at any point of time during the day or any other incident light. In an embodiment, the top structure 208 protects the rider and the pillion from direct exposure to sunlight at all time of the day. Similarly, the vehicle 200 of the present subject matter is a green vehicle capable of utilizing the power generated by the plurality of solar panels 213 to power various loads of the vehicle 200. In an embodiment, the vehicle 200 provides an eco-friendly personal transportation means for the user, which generates less pollutants.

Figure 4A:
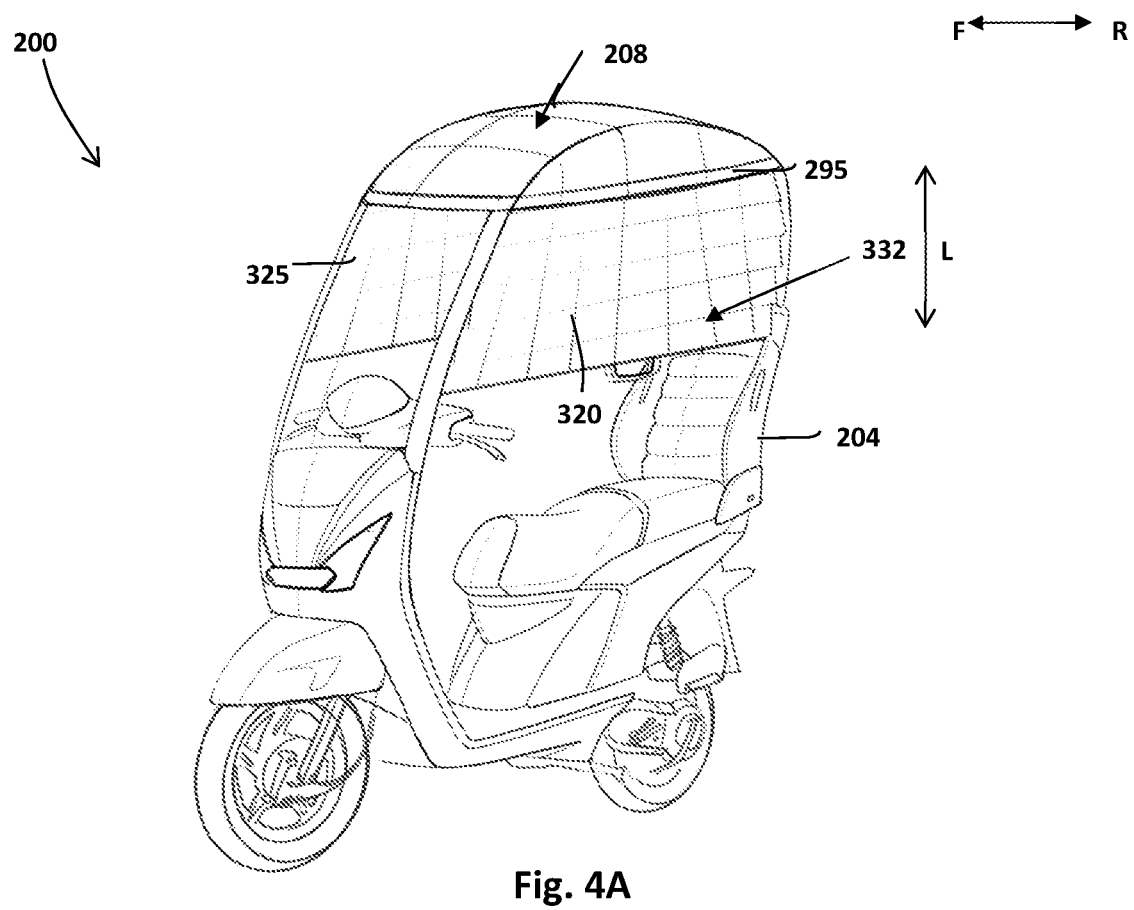
FIG. 4A depicts a left side perspective view of a vehicle provided with a canopy structure, in accordance with an embodiment of the present subject matter.

FIG. 4A depicts a left side perspective view of a vehicle 200 provided with a canopy structure, in accordance with another embodiment of the present subject matter. In this embodiment, the top structure 208 of the vehicle 200 is enmolded with the front structure 215 (shown in FIG. 2A) and the rear structure 220 (shown in FIG. 2A). In one embodiment, the top structure 208 of the present subject matter is made of a light weight material selected from a group consisting of composite material like fiber reinforced plastic and polyacrylonitrile, aluminum, sheet metal and plastic. In an embodiment, the canopy structure of the present subject matter includes a plurality of portions containing solar panels 213 (shown in FIG. 2A) or array of photo voltaic cells embedded in the panel capable of receiving solar energy and charging an energy storage device. The plurality of portions containing solar panels 213 includes one or more fixed portions and one or more flexible portions 332, also called as a retractable member 332. The embedding of the solar panels 213 in both one or more fixed portions and one or more flexible portions 332, enables maximum exposure area when both the one or more fixed portions and the one or more flexible portions are employed, while minimum desirable exposure area is achieved when only one or more fixed portion is employed. In an embodiment, the one or more retractable member 332 includes a left retractable member 320 and a right retractable member 325. The one or more retractable members 332 is capable of being retracted upwardly towards the top structure 208 of the vehicle 200 and stretchable downwardly from the edges of the top structure 208 of the vehicle 200 towards the wheels of the vehicle 200. The usage of the one or more fixed portions and one or more flexible portions ease in enhancement of the solar impedance area without obstructing or restricting the rider's view.

The one or more retractable members 332 are capable of being detachably attached from the edges of the top structure 208 of the vehicle 200. The one or more retractable members 332 are retractable and capable of being folded upwardly and unfolded downwardly manually or by automated means. In an embodiment the one or more retractable member 332 are in folded condition or detached when the vehicle 200 is in operable condition. In an embodiment, the one or more retractable member 332 are in unfolded condition up to a predetermined length L and attached with the one or more fixed portions for example, the top structure 208 when the vehicle 200 is in operable condition. In an embodiment, the one or more retractable member 332 are in completely unfolded condition and attached with the one or more fixed portions for example, the top structure 208 when the vehicle 200 is in inoperable condition. In an embodiment, the one or more flexible retractable member 332 include one or more sensors (not shown) that restrict the downward movement of the one or more retractable member 332 from a predetermined length L or from complete unfolded condition, when the vehicle 200 is in operable condition. The sensors ensure prevention of sagging of the one or more flexible portions during prolonged usage due to its flexible nature, thereby ensures prevention of damage the solar cells disposed on the external surface. In this present embodiment the one or more retractable member 332 are in half folded state or are of a length which reaches up to a lower end portion of extended backrest structure 206 of the vehicle 200, towards the backrest member 204 up to the predetermined length L of the vehicle 200.

Figure 4B:
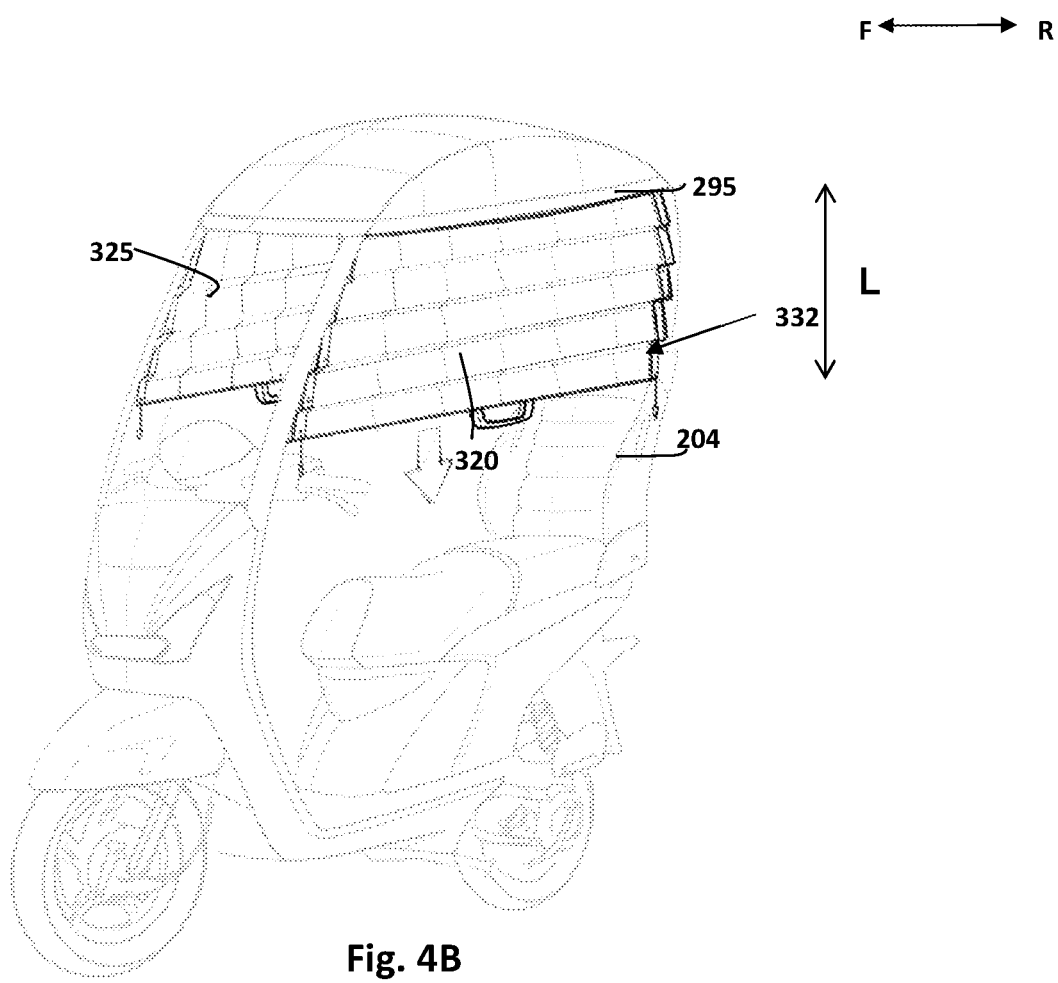
FIG. 4B illustrates a left side perspective view of a vehicle provided with a canopy structure, in accordance with an embodiment of the present subject matter.

FIG. 4B illustrates a left side perspective view of a vehicle 200 provided with a canopy structure, in accordance with another embodiment of the present subject matter. In this embodiment, the one or more retractable members 332 are in half folded state, or are of a length which reaches up to an end portion of extended backrest structure 206 (shown in FIG. 2A) of the vehicle 200, towards the backrest member 204 up to the predetermined length L of the vehicle 200. The one or more retractable members 332 include a plurality of solar panels 213. The plurality of solar panels 213 embedded into the upper surface of the top structure 208 is uniformly distributed such that a square surface area unit, for example of a size of one square centimetre of at least one of the plurality of solar panels 213, is capable of generating approximately 6 to 16 milliwatts of power per square centimetre. In an embodiment, the plurality of solar panels 213 are closely spaced apart from each other uniformly across the one or more flexible portions 332.

Figure 4C:
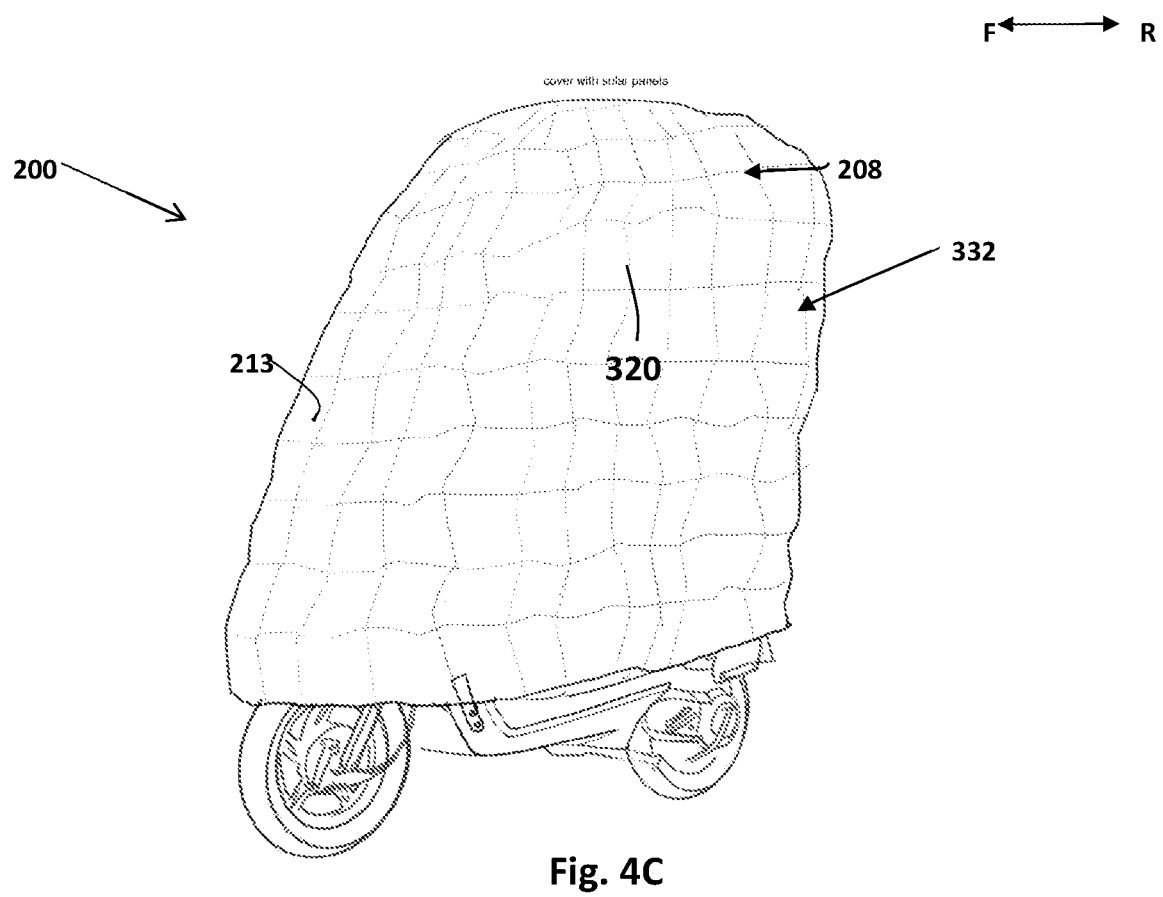
FIG. 4C depicts a left side perspective view of a vehicle provided with a canopy structure, in accordance with another embodiment of the present subject matter.

FIG. 4C depicts a left side perspective view of a vehicle 200 provided with a canopy structure, in accordance with another embodiment of the present subject matter. In this embodiment, the one or more retractable members 332 are in unfolded condition and attached with the one or more fixed portions, for example, attached with the edges of the top structure 208, when the vehicle 200 is in inoperable or parked condition. The one or more retractable members 332 are capable of being unfolded downwardly completely manually or by automated means. The plurality of solar panels 213 embedded to the upper surface of the top structure 208 is uniformly distributed such that a square surface area unit, for example of a size of one square centimetre of at least one of the plurality of solar panels 213, is capable of generating approximately 6 to 16 milliwatts of power per square centimeter. In an embodiment, the plurality of solar panels 213 are closely spaced apart from each other uniformly across the one or more flexible portions 332.

Figure 5:
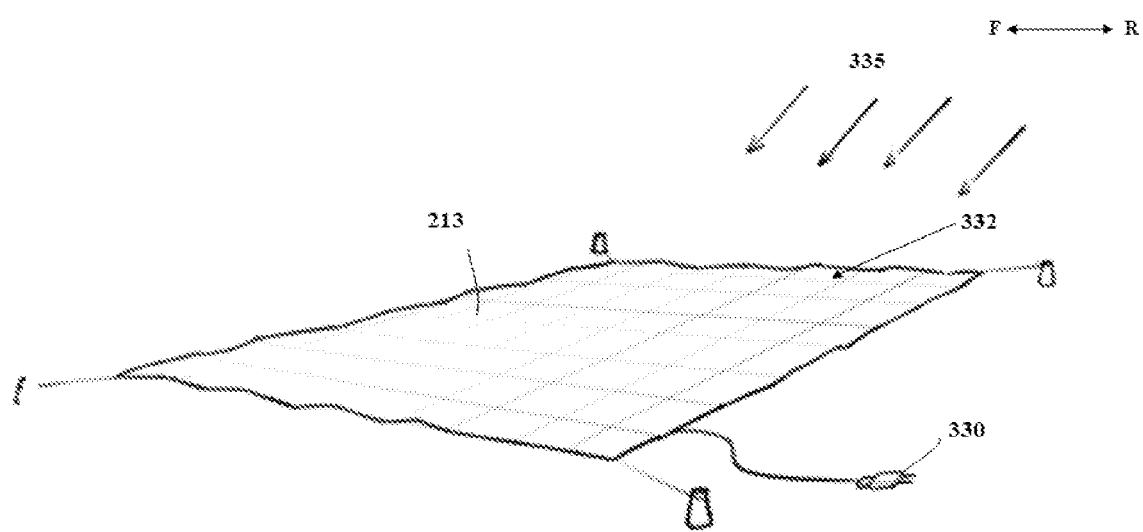
FIG. 5 depicts one or more retractable portion detached from the vehicle and placed under sunlight in accordance with an embodiment of the present subject matter.

FIG. 5 depicts one or more retractable members 332 detached from the vehicle 200 and placed under solar rays 335 in accordance with an embodiment of the present subject matter. In an embodiment, the one or more retractable members 332 including plurality of solar panels 213, is capable of being directly placed under the solar rays 335 or any other source light energy radiation and desirable intensity in order to enable it to produce solar power and at the same time charge a power source (not shown) by means of a charging means 330. As per another embodiment the one or more retractable members 332 is capable of being foldably stowed inside a boxlike compartment (not shown), and the boxlike compartment is capable of being detachably attached to a mounting member 302 (shown in FIG. 2A) of the rear structure 220 (shown in FIG. 2A) of the vehicle 200.

In another embodiment the box like compartment, being a part of the rear structure 220 of the vehicle 200. The capability of the one or more retractable members 332 of being foldably stowed inside the box like compartment, ensures easy storage of the one or more retractable member 332 inside the vehicle 200.

In an embodiment, the box like compartment acts as a solar kit assembly capable of being detachably attached to the vehicle 200. The box like compartment acting as a detachably attached solar kit assembly ensures removal of the box like compartment from the vehicle 200 when not in use and ensures freeing of the vehicle 200 usable space. Further detachably attached storage space ensures in reduction of the overall weight of the vehicle 200, by removal of the box like compartment from the vehicle 200 as and when required.

In another embodiment the box like compartment, is an extended backrest structure 206 of the vehicle 200. The usage of the extended backrest structure 206 as the boxlike compartment ensures efficient usage of the free space of the vehicle 200 to store the one or more retractable member 332 without compromising with the existing vehicle storage space.

Further, one or more flexible portions capable of being stowed inside the box-like compartment, is not restricted to shape of any particular vehicle, thereby can be flexibly used across all types of vehicles, including step through type vehicles 200 having canopy without disturbing the balance of the vehicle 200.

Further, the usage of the one or more flexible portions along with the one or more fixed portions is a cost-effective solution.

In another embodiment, the vehicle 200 is an electric operated vehicle, wherein the power unit 180 is an electric motor. In another embodiment, the vehicle 200 is a hybrid vehicle, and the power unit 180 includes an engine assembly and an electric motor.

LIST OF REFERENCE NUMERALS

| | |
|---|---|
| 100, 200: Vehicle | 210: Windshield structure/member |
| 105: Frame assembly | 212: Couplers |
| 105A: Head tube | 213: Solar panel |
| 105B: Main tube | 215: Front structure |
| 105C: Pair of railing | 220: Rear structure |
| 110: Handle | 275: Front most portion |
| 115: Front wheel | 280: Sideward portion |
| 120: Front suspension(s) | 285: Head rest portion |
| 125: Rear wheel | 290: Line of vision |
| 130: Rear suspension(s) | 295: Side surface |
| 135: Seat assembly | 302: Mounting portion |
| 140A, 140B, 140C: plurality of panels | 320: Leftmost region |
| | 325: Rightmost region |
| 145: Floorboard | 332: Reractable member |
| 150: Front fender | 330: Charging means |
| 155: Rear fender | 335: Solar rays |
| 160A: Headlight | |
| 160B: Tail light | |
| 180: Power unit | |
| 204: Backrest structure/member | |
| 206: Extended backrest structure | |
| 208: Top structure | |

We claim:

1. A step-through type vehicle comprising:
a frame assembly;
at least one front wheel and at least one rear wheel connected to the frame assembly and capable of being rotated by a power unit of the step-through type vehicle; and
a plurality of portions comprising one or more flexible portions and one or more fixed portions,
wherein
the one or more fixed portions include a front structure, a rear structure, and a top structure disposed between the front structure and the rear structure,
the one or more flexible portions include at least one retractable member,
the top structure and the at least one retractable member include a plurality of solar panels;
the at least one retractable member is detachably attached with the top structure, and is capable of being retracted upwardly towards the top structure, and stretched downwardly from the top structure towards the at least one front wheel and the at least one rear wheel; and
the at least one retractable member is capable of being foldably stowed inside at least one box like compartment, the at least one box like compartment being at least one part of the rear structure of the step-through type vehicle.

2. The step-through type vehicle as claimed in claim 1, wherein the front structure includes a windshield member extending downwardly towards front of the step-through type vehicle.

3. The step-through type vehicle as claimed in claim 1, wherein the rear structure includes a seat sub-structure extending longitudinally rearwardly above the at least one rear wheel, and a mounting member capable of receiving one or more portions of the rear structure.

4. The step-through type vehicle as claimed in claim 1, wherein the rear structure includes at least one of a backrest structure extending rearwardly upwardly from a seat sub structure and an extended backrest structure extending upwardly from the backrest structure, wherein the backrest structure is capable of joining a mounting member of the step-through type vehicle.

5. The step-through type vehicle as claimed in claim 1, wherein the at least one retractable member is capable of being folded when the step-through type vehicle is in operable condition.

6. The step-through type vehicle as claimed in claim 1, wherein the at least one retractable member is capable of being unfolded or detached from one or more fixed portions of the step-through type vehicle when the step-through type vehicle is in an inoperable condition.

7. The step-through type vehicle as claimed in claim 1, wherein the at least one retractable member is capable of one of being retracted upwardly up to a predetermined length; being unfolded downwardly up to a predetermined length; being retracted completely upwardly up to a side most portion of the top structure; and being stretched completely downwardly up to a full length of the step-through type vehicle.

8. The step-through type vehicle as claimed in claim 1, wherein the at least one retractable member is capable of being by folded and unfolded one of manual means and automated means.

9. The step-through type vehicle as claimed in claim 1, wherein the top structure includes a cover member extending substantially horizontally rearwardly above a seat sub-structure, and wherein the at least one downwardly retractable member is disposed within the cover member.

10. The step-through type vehicle as claimed in claim 1, wherein the step-through type vehicle is an electric operated vehicle, and wherein the power unit is an electric motor.

11. The step-through type vehicle as claimed in claim 1, wherein the step-through type vehicle is a hybrid vehicle, wherein the power unit includes an engine assembly and an electric motor.

12. The step-through type vehicle as claimed in claim 1, wherein the top structure and the at least one retractable member are made of a light weight composite material being one of fiber reinforced plastic, polyacrylonitrile, aluminum, sheet metal and plastic.

13. The step-through type vehicle as claimed in claim 1, wherein the top structure includes a bottom surface and an upper surface, wherein the upper surface of the top structure is provided with one or more of the plurality of solar panels being capable of receiving solar energy.

14. The step-through type vehicle as claimed in claim 1, wherein the top structure is substantially dome shaped and provided with chamfered edges.

15. The step-through type vehicle as claimed in claim 1, wherein the top structure is spheroid shaped without edges being chamfered.

16. The step-through type vehicle as claimed in claim 1, wherein the at least one retractable member is capable of being extended sidewardly downwardly from edges of the top structure of the step-through type vehicle.

17. The step-through type vehicle as claimed in claim 1, wherein the top structure is at least one of a half-egg shaped, elliptical solid, elliptical spheroid and egg shaped.

18. The step-through type vehicle as claimed in claim 1, wherein the at least one box like compartment is capable of being detachably attached to a mounting member of the rear structure of the step-through type vehicle.

19. The step-through type vehicle as claimed in claim 1, wherein the at least one box like compartment is a part of an extended backrest structure of the step-through type vehicle.

20. The step-through type vehicle as claimed in claim 1, wherein the at least one box like compartment acts as a solar kit assembly capable of being detachably attached to the step-through type vehicle.

21. The step-through type vehicle as claimed in claim 1, wherein the at least one retractable member of the step-through type vehicle includes one or more sensors restricting a downward movement of the at least one retractable member when the step-through type vehicle is in operable condition.

22. The step-through type vehicle as claimed in claim 1, wherein the top structure includes at least one pillion handle disposed downwardly from its side surface allowing a pillion to hold when the step-through type vehicle is operable.

23. The step-through type vehicle as claimed in claim 1, wherein one square centimeter of the plurality of solar panels is capable of generating approximately 6 to 16 milliwatts of power per square centimeter.

* * * * *